April 16, 1957  S. D. SKINNER ET AL  2,788,960
CONTINUOUS CALCINATION PROCESS AND APPARATUS THEREFOR
Filed Jan. 8, 1954  3 Sheets-Sheet 1

Fig. 1

April 16, 1957  S. D. SKINNER ET AL  2,788,960
CONTINUOUS CALCINATION PROCESS AND APPARATUS THEREFOR
Filed Jan. 8, 1954  3 Sheets-Sheet 2
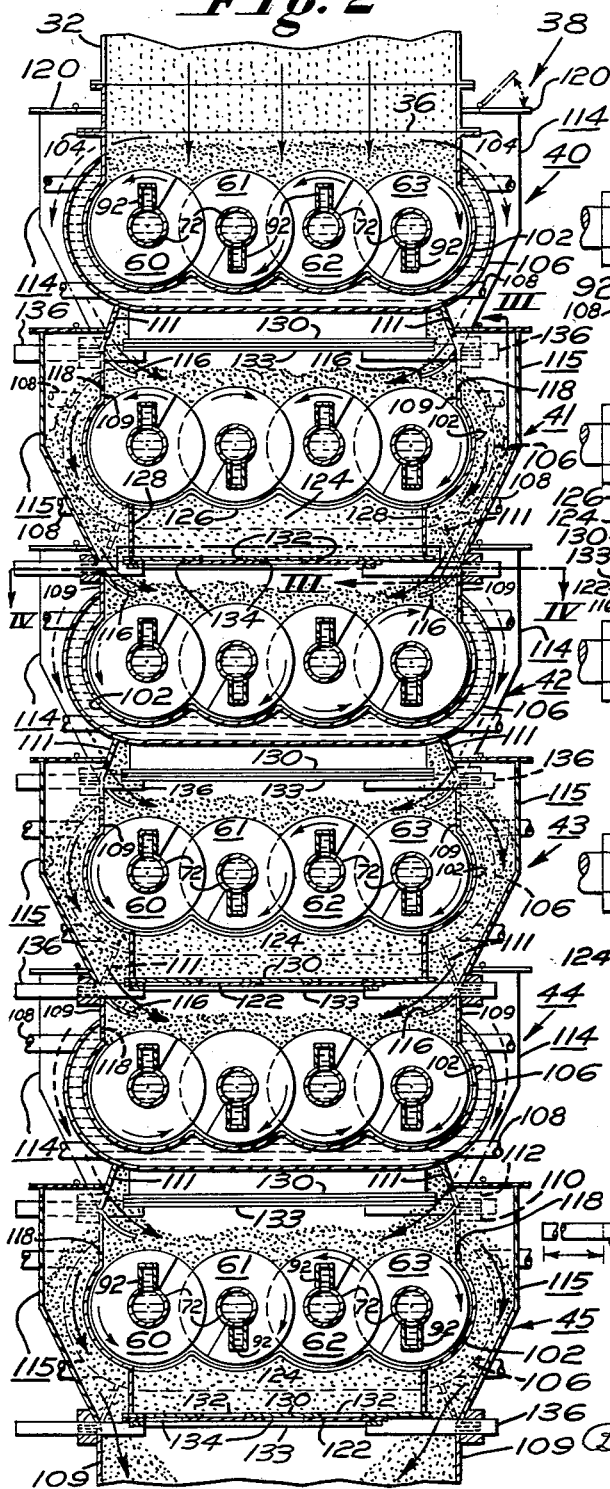
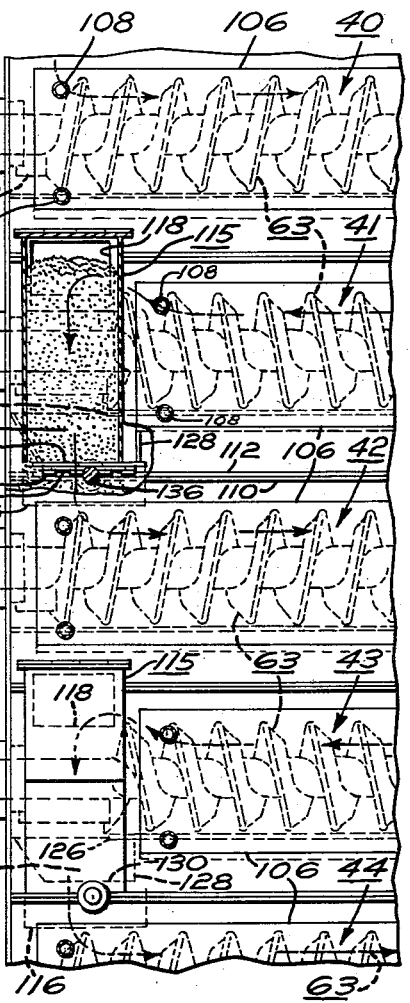
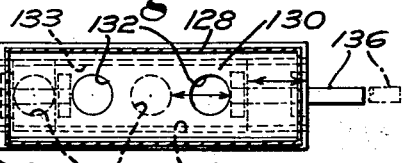
INVENTORS:
SIDNEY D. SKINNER and
LEWIS H. SEUFERT
BY
Beau, Brooks, Buckley & Beau,
ATTORNEYS.

United States Patent Office 2,788,960
Patented Apr. 16, 1957

2,788,960

CONTINUOUS CALCINATION PROCESS AND APPARATUS THEREFOR

Sidney D. Skinner, Williamsville, and Lewis H. Seufert, Akron, N. Y., assignors to National Gypsum Company, Buffalo, N. Y.

Application January 8, 1954, Serial No. 402,952

16 Claims. (Cl. 263—25)

The present invention relates generally to calcination of materials by the application of heat and more particularly to an improved method and apparatus for continuously calcining gypsum.

Calcined gypsum or stucco has been produced heretofore, in general, by two well defined procedures; the one by the so-called kettle process and the other, the so-called rotary calcination process.

The kettle process is operated in batches where ground gypsum rock is fed to an externally heated receptacle provided with stirring equipment. The kettle is heated by direct firing and the temperature on the exterior of the kettle is from 1500° to 2000° F. Heating of the kettle is continued so long as the products in the kettle have an appearance of boiling due to the escape of a part of the water of crystallization from the gypsum rock. When the boiling ceases and the charge in the kettle settles, the contents of the kettle are immediately discharged.

In this procedure the gypsum rock being calcined is not in contact with the products of combustion of the fuel used in heating the charge and the resultant calcined gypsum is of good grade and high white, not being contaminated with fly ash, soot and the like. The operation suffers from high labor costs and difficulty of control since skilled operators are necessary in order to determine when the kettle has settled and, therefore, when the charge must be removed to prevent the production of so-called overburned or overcalcined stucco.

Gypsum rock is also calcined in rotary calciners which are internally heated and, therefore, the end product is at all times in contact with the products of combustion employed for heating the calciner. Even where the heating medium is oil or gas, a certain amount of contaminant is picked up by the calcined gypsum and appears in the final product as black specks which are undesirable since the gypsum so contaminated cannot be sold as a first-grade material.

Like the kettle process, the temperature at the burners is extremely high and the interior of the calciner is also at a very high temperature so that the danger of overcalcination of the gypsum rock, with the production of considerable amounts of anhydrite, is ever present.

Proposals have also been made to calcine very finely ground gypsum rock by passing it in contact with a superheated steam, or the like, whereby the gypsum will be fluidized by the steam during heat exchange therebetween to free water of crystallization of the gypsum. It has been determined that this method is not practicable and when used to continuously calcine gypsum has resulted in a very poor quality product and frequent breakdowns of the apparatus.

It is an object of the present invention to provide a continuous procedure for the calcination of gypsum rock wherein neither the gypsum rock nor the end product, stucco or plaster, is in contact with the products of combustion of the heating medium.

It is also an object of the invention to provide an indirectly heated continuous calciner for gypsum rock wherein the temperatures of the heat exchange surfaces therein in contact with the resultant plaster will not produce overburned stucco.

It is also an object of the invention to provide an indirectly heated continuous calciner wherein control of the temperature of the calciner can be regulated over a wide range in order to obtain the efficient elimination of water of crystallization from gypsum rock, that is, calcium sulfate dihydrate, to produce calcium sulfate hemihydrate.

It is also an object of the invention to provide an improved calciner apparatus embodying the aforesaid features and comprising a plurality of superposed gypsum processing tiers, each selectively individually controllable as to temperatures and material residence time to provide highly flexible operational conditions to permit selective control of the characteristics possessed by the end product.

It is also an object of the invention to provide an improved highly compact apparatus of the aforesaid type wherein the gypsum will be uniformly heated throughout by screw conveyor heat exchange portions maintained at certain critical temperatures to permit operation of the apparatus with automatic heating means and which will eliminate overburning during the calcination process to provide increased output of improved end product with minimum floor space requirements.

It is also an object of the invention to provide an improved apparatus of the aforsesaid type adapted to more rapidly remove the vaporized water of crystallization from the heated gypsum material and to shorten the residence time of the gypsum in such apparatus incidental to calcining operations.

It is also an object of the invention to provide an improved apparatus for continuously calcining and processing gypsum in order that the end product from the output end of the apparatus may be channeled directly into packages and containers for sale to the trade.

In accordance with the principles of the present invention, the gypsum rock is first reduced in size by any suitable form of comminution in order to obtain a product 85% of which will pass through a 100 mesh sieve. Where certain forms of grinding equipment are employed, such as the well known Raymond mill, the ground product, due to friction and attrition, will attain a temperature of from 140 to about 180° F., and in this operation most of the free water or moisture, as contrasted with the water of crystallization of the gypsum itself, will have been removed.

Under those conditions and without cooling, the product is then sent to the continuous calciner of the present invention and subjected to the calcining conditions described further hereinafter.

Where the product prepared by preliminary grinding has not reached a temperature sufficiently high or where the ground product has been sent to storage, in accordance with this invention, it should be given a preliminary heating either within or without the continuous calciner of the present invention; otherwise lumping and segregation may occur in the mass with consequent production of a non-uniform product by reason of undercalcination.

The ground gypsum rock having a classification such that 85% will pass through 100 mesh and having a temperature sufficiently high to avoid lumping, is then led into an indirectly heated calciner which may be in the form of a cylinder or trough. The feed prepared as above described is then passed through the calciner at a controlled rate. This is done generally by means of a screw conveyer. The gypsum rock is subjected, while in the calciner, to a temperature of above 212° F., and about 400° F. at the point of discharge from the calciner. The pitch of the screws of the conveyer and the speed of revolution are so regulated that the material will require from about 10 to 150 minutes to pass through the calciner which may be a single calciner or which may be one or more tiers or flights which may, for instance, be superposed one upon the other; the actual material residence time and temperatures will depend upon various factors more fully considered hereinafter.

The continuous calciner is provided with heat exchange means whereby the heat from the circulating fluid in the exchange means is given up to the ground gypsum rock during its passage through the calciner and, by reason of the heat transferred to the ground gypsum rock, water of crystallization is removed therefrom to produce a product containing about 6.2% water of crystallization.

The heat exchange means may comprise hollow portions in the screw conveyers, and/or a jacket surrounding the troughs arranged to contain such screw conveyers, through which the heated fluid may be passed and circulated. This fluid may be passed in a direction either concurrent with the direction of flow of the calcining material or counter to such flow. The temperature of the fluid will be above 212° F. and, at the point of discharge of the finished product, about 400° F.; the actual temperatures used in connection with practice of the form of the invention shown in the drawing will be more specifically set forth below. In any event, it will be kept in mind that the temperature of the fluid in the heat exchanger at those portions of the apparatus where the finished products debouches will preferably be controlled relative to the temperature of the discharge product whereby there is maintained a differential between the temperature of the discharged product and of the heating medium of about 100° F.

By the maintenance of this close tolerance of the temperature differential, a uniform final product is obtained containing substantially no anhydrite or overcalcined gypsum and substantially no dihydrate or under calcined gypsum.

In the drawing:

Fig. 1 is a partly schematic front elevational view showing an embodiment of the invention;

Fig. 2 is an enlarged vertical sectional view taken along the line II—II of Fig. 1;

Fig. 3 is an enlarged fragmentary rear view of the calciner shown in Fig. 1 being an orthographic projection of the right-hand side of the sectional view of Fig. 2 having a portion thereof partly broken away along the line III—III of Fig. 2;

Fig. 4 is a partial fragmentary view taken generally along the line IV—IV of Fig. 2;

Figure 5:
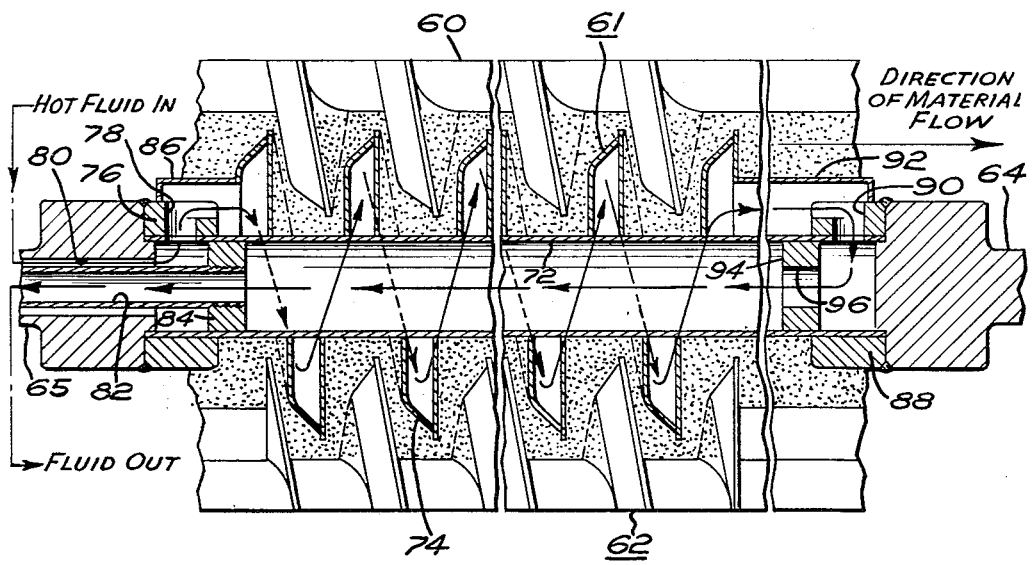
Fig. 5 is a fragmentary partly sectional view schematically illustrating circulation of a heating medium through a typical screw conveyer arrangement.

Referring more particularly to the drawing, there is shown in Fig. 1 a hopper 10 at one end of a pre-heat unit 12 which consists of a plurality of intermeshing screw conveyers as indicated diagrammatically at 11 having hollow portions through which a heating medium may be passed and circulated, being disposed in an elongate horizontally disposed trough 14 communicating at one end with the hopper 10 and having its opposite end communicating with an aridizing unit 16 which is adapted to treat the material to be processed with a spray of a suitable drying agent or aridizing solution such as calcium chloride to cause the end product to have a lower consistency, such processing being so carried out only when such lower consistency material is desired (Fig. 1). For the above purpose, the aridizing unit 16 comprises a housing 18 internally containing an inclined ramp 20 extending upwardly from the bottom of the trough 14, nozzles 22 connected to a supply of a drying agent such as for example of calcium chloride for spraying it into the material to be calcined, and a rotary aerator consisting of a double ribbon conveyer element 24, or the like, rotatably mounted by means of a shaft 26 in the sides of the housing 16. The ribbon elements 24 of the conveyer will be adapted to act upon the material conveyed from the trough 14 to disperse it upwardly along the ramp 20 and over into the path of the aforesaid spray of drying agent (Fig. 1). A screen 28 is preferably mounted inwardly of the housing 16 adjacent the top of the ramp 20 and may be vibrated thereat for example by an attached reciprocating push rod device 30 to facilitate passage of the aridized comminuted gypsum therethrough.

The housing 16 is shown to be provided with a depending material conducting funnel 32 arranged to feed an inlet port 36 formed in the upper end of a tiered calcining apparatus 38 comprising a plurality of superposed calcining tier units 40 to 45, inclusive (Fig. 1). It will be appreciated that the preheat unit 12 and the housing 16 may each be externally jacketed to contain a flow of heating fluid to facilitate preheating of the gypsum preparatory to its being conveyed into the calciner unit 38 as aforesaid. In this case, there will be provided a connecting conduit 46 communicating between the jacket of the trough 14 and the jacket of the casing 32 for transfer of the heating medium therebetween (Fig. 1).

The tiers 40 to 45, inclusive, are shown to be supported at their ends by means of structural frame devices 48 and 50, and intermediate thereof, by a frame support 52. Furthermore, the frame devices 48—50 will be arranged to support a plurality of opposed journal box devices 54—56 at the opposite ends of each of the tier units 40 to 45 inclusive, as shown in Fig. 1.

As shown in Figs. 1 and 3, each of the tier units 40—45, inclusive, will be arranged to contain a plurality of intermeshing screw conveyer members 60, 61, 62, and 63, each having end shaft portions 64 and 65 fitted through suitable stuffing boxes in the ends of the calciner to protrude outwardly therefrom to be supported in journaled relation in the journal box devices 54 and 56. The screw conveyer end shaft portions 64 will each be connected by means of flexible coupling devices 66 to one of a plurality of superposed gear boxes 68 which will be preferably driven from individual drive means (not shown). It will be understood that the gear boxes 68 will be adapted to drive each of the intermeshed screw conveyers 60, 61, 62 and 63 in each tier at similar speeds relative to each other, while at the same time being adapted to selectively adjust the speed of operation of the intermeshing screw conveyers of each of the superposed tiers. Thus, it will be appreciated that materials in process may be conveyed through each of the troughs 40—45, inclusive, at selectively variable rates of speed to give operational control for obtaining the desired characteristics in the calcined end product debouching from the bottom tier 45.

As shown in Fig. 5, a typical screw conveyer member 60 comprises for example a generally hollow elongate shaft portion 72 formed with a hollow helical screw flange 74 along its periphery providing a tortuous helical path internally thereof through which may be circulated a heated fluid in the manner indicated schematically by the arrows. For the purpose of channeling the fluid flow along the lines indicated, the screw conveyers will preferably be fitted with appropriate coupling elements at their opposite ends. At the fluid inlet ends there may be provided a press-fitted outer collar member 76 having a radially extending aperture 78 communicating through an aligned aperture in the shaft wall with the inside of the shaft 72. The shaft end portion 65 is shown to be fitted to the end of the shaft portion 72 in fixed relation thereto as by welding to the collar member 76 and is provided with an oil inlet bore 80 communicating with the interior of the shaft 72. An oil outlet pipe 82 of substantially smaller external diameter than the aperture 80 is shown to be fitted through the aperture 80 and will be threaded at its inner end into an inner collar member 84 press-fitted into the shaft 72 to a position inwardly of the aperture 78 therein. The wall of the hollow flange 74 will be formed to extend outwardly and then inwardly into the hollow boss portion shown at 86 embracing the aperture 78 whereby fluid injected through the aperture 80 around the walls of the pipe 82 will be channeled through the aperture 78 into the helical path provided inwardly of the screw conveyer through the flange portions 74.

To provide return flow of the heating fluid through the shaft 72, an outer collar member 88 is fitted over the driven end of this shaft and is provided with a radially extending aperture 90 communicating through an aligned aperture in the shaft wall with the inside of the shaft 72 as shown in Fig. 5. The interior of this end of the shaft will be closed off by the inner end of the member 64 fixed thereto as by welding to the outer collar 88, and the endmost wall of the hollow screw flange 74 will be formed into a hollow boss portion extending therefrom over the collar 88 so as to embrace the aperture 90 therein in the manner indicated at 92 whereby the heating fluid will be channeled from the hollow flange 74 through the aperture 90 and then back through interior of the hollow shaft 72 and the pipe 82 to the fluid supply reservoir (not shown). An inner support collar 94 having a flow restricting passage 96 therein may also be press-fitted into the shaft 72 to a position inwardly of the aperture 90 therein as shown in Fig. 5.

It will be appreciated that adjacent of the intermeshing screw conveyers 60 to 63, inclusive, will preferably be made of opposite hand and therefore will be arranged to rotate in opposite directions relative to each other in order to cause a uniform flow of materials through the respective troughs in which they are mounted as for example is indicated in Fig. 5. Of course, if the screws are all made of the same hand, they will be rotated in similar directions relative to each other to also accomplish conveyance of the materials to be processed.

Referring now to Figs. 2 and 3, the tiers 40 to 45, inclusive, are each enclosed by an elongate casing 102 having curvilinear bottom and side portions shaped to conform to the outline of the intermeshing screws 60 to 63, inclusive, of each tier. The sides of the casing 102 in the top tier 40 will be preferably formed generally vertically upwardly and then laterally inwardly to be integrally joined over the screws 60 to 63, inclusive, to provide an enclosed passage for channeling the flow of comminuted gypsum. The inlet 36 will preferably be of generally rectangular form cut through one end of the upper face of the top casing 102 and will be provided with flange portions 104 to facilitate connection to the funnel 32 depending from the aridizing unit 16.

The bottom and sides of each of the casings 102 are shown to be jacketed by means of elongate outer casings 106 having generally curvilinear side portions integrally connected along their upper edges upwardly of the intermeshing screws 60 to 63, inclusive, and at their ends, to the casing 102. As shown in Fig. 1, the outer casings 106 will be provided with pairs of heating fluid inlet apertures 108—108 at each end of their opposite ends whereby the heating fluid may be easily circulated between the inner and outer casings 102 and 106, respectively, to facilitate dehydration and calcination of the material conveyed by the screw conveyers.

On the other hand, the casings 102 of the tiers 41 to 45, inclusive, are each shown in Fig. 2 to have their opposite sides 109 bent vertically upwardly and then laterally outwardly into a pair of opposed marginal edge portions 110. The bottoms of the outer casing 106 are each shown to be provided with a pair of opposed depending supporting wall portions 111 extending angularly outwardly and then laterally outwardly into marginal supporting flange portions 112 adapted and arranged to fit over the marginal edge portions 110 of the next succeeding tier for supporting connection thereto. Therefore, it will be appreciated that these casings may be manufactured and sold as individual units adapted to be built up in superposed relation into an apparatus comprising any desired number of tiers as may be required. Furthermore, the bottom supporting wall portions 111 each will be preferably provided with a plurality of inspection doors 113 through which the material passing through the apparatus may be observed at various points throughout the processing thereof.

A particular feature of the invention is to provide opposed outwardly distended flow-guiding bustles on alternate ends of the tiers 40 to 45, inclusive, the bustles on the superposed ends of the alternate tiers 40, 42 and 44 being designated as 114, while the bustles on the superposed ends of the alternate tiers 41, 43 and 45 being designated as 115, the bustle 114 on the upper tier 40, of course, being located at the tier end opposite the inlet 36 therein (Figs. 1, 2, and 3).

As shown in Figs. 2 and 3, each of the bustles 114 and 115 is formed to extend outwardly from the inner casing 102 and is provided with a downwardly inwardly tapering lower chute portion 116 fitted through the casing portion 110 and being arranged to funnel materials thereby onto the screw conveyers in the next succeeding tier of the apparatus through a cutaway of such casing portion inwardly of the bustles.

It is a further feature of the invention to provide a material metering port 118 of generally rectangular form in the walls of the casing 102 inwardly of each of the bustles 114 and 115 (Figs. 2 and 3). This port will be positioned to have its lower edge preferably positioned substantially at a level with the uppermost points of the screw conveyers in each tier, thereby providing an outlet weir in the trough discharge ends inwardly of the bustles 114 and 115 for maintaining the level of the material in process over the screw conveyers for full utilization of the heating potential of the heating medium circulated therethrough in the above manner. Furthermore, the size of the ports 118 will be held to critical dimensions to provide a controlled flow for example of gypsum from the trough into the bustles of chutes 114—115 and the height of the ports may be varied in order that the dwell time of the material in each tier may be maintained for any desired period to perform the desired heating of the material for still further operational control thereover as more fully described hereinafter.

In order to provide easy access for inspection of the metering ports 118, and the interior of the bustles 114 and 115 generally during processing of gypsum or the like, each of the bustles is preferably provided with a hinged cover plate 120 which is arranged to protrude beyond the outer edge of the bustles for ease in manipulation.

A further feature of the invention lies in the provision of individually controllable slide gates as indicated at 122 which will be arranged to provide flexibility in the apparatus for selectively controlling the rate of flow of gypsum, or the like, therethrough as where increased output is desired, or where it is desired to change the characteristics of the end product.

The slide gate 122 is shown to be fitted in sliding relation relative to the bottom of a well 124 arranged at the discharge end of each of tiers 40 to 45, inclusive Figs. 3 and 4). The well 124 is formed by cutting back the bottom portion of the inner casing 102 between the supporting wall portions 111 to the edge 126 (Figs. 2 and 3) and then forming the aperture resulting therefrom to have depending walls and a floor portion 128 and 130, respectively, which define the well 124 (Fig. 4). The floor 130 is provided with a plurality of spaced aligned apertures 132 centrally aligned between longitudinally slotted slide gate support members 133, the apertures 132 being arranged to cooperate with similar apertures 134 in the slide gate 122 to pass gypsum, or the like, into the next succeeding tier at selectively controllable rates depending upon the position of the slide gate as it is moved by means of a handle portion 136 toward its full open position. In its closed position, the apertures of the slide gate will be arranged to be out of alignment with the apertures 132 as shown in Fig. 3. In the latter case, only the ports 118 will serve to limit the rate of flow of materials through each tier in the aforesaid manner.

Thus, it will be appreciated that the aforesaid flow control arrangement of the invention in cooperation with the structure above described will provide a highly flexible and compact apparatus which may be used for heat treatment of various materials without expensive structural rearrangements of the parts since each tier may be adapted to accommodate the entire output of each preceding tier with maximum efficiency even where the apparent density of the material increases during processing and thereby will prevent caking or blocking of materials in the apparatus. Also, any desired number of tiers may be used, and tiers may be added or removed with relatively minor structural rearrangement.

As shown in Fig. 1, the calciner apparatus 38 may be provided with vents 140 and 142 which permit the escape of steam produced during the calcination of calcium sulfate dihydrate with the production of calcium sulfate hemihydrate and as a still further feature of the invention this apparatus may be adapted to have pairs of vapor ducts 144—146 extending along both sides thereof, each one communicating at spaced intervals therealong with the interiors of the tier units 40 to 45, inclusive, opposite the atmospheric vents located over the level of the materials in process in each tier as indicated at 148 to 152, inclusive. Thus it will be appreciated that this withdrawal of the steam will preclude condensation of any part thereof in the calciner, and therefore will contribute toward more efficiently achieving an improved end product having uniform characteristics with minimum residence time during processing thereof.

Figure 6:
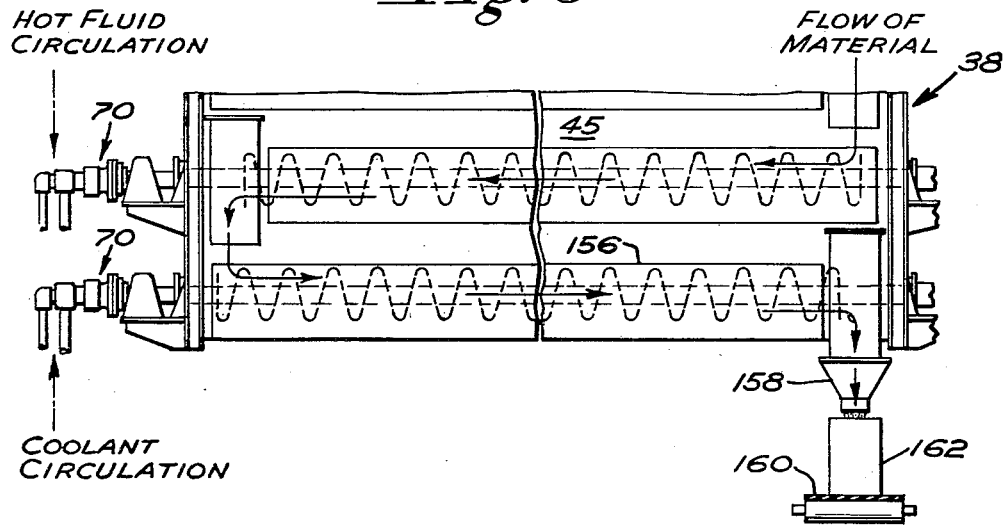
Fig. 6 is a generally schematic front elevational view showing a modification of the apparatus of Fig. 1.

In order to further improve the quality of the end product the calciner unit 38 may be arranged to include an additional tier unit 156 as shown for example in Fig. 6. The tier unit 156 would be constructed and arranged in the same manner as hereinabove set forth for the tiers 40 to 45, inclusive, whereby the material in process would be conveyed therethrough into a funnel arrangement 158 arranged in cooperation with a conveyer belt 160 carrying empty packages 162 to a position beneath the funnel 158. As diagrammatically illustrated in Fig. 6, a liquid coolant would be circulated through the heat exchange portions of the tier 156 to uniformly cool at an accelerated rate the materials being processed to arrest undesirable calcination after the desired characteristics have been obtained as for example is apt to occur when the material is sent to storage and allowed to cool at a normal rate after being debouched from the calciner, and therefore, the materials may be immediately packaged upon being processed through the unit 38. Furthermore, if it is desired to add an accelerator such as terra alba as for example when the material processed is gypsum, this accelerator could readily be interspersed in the end product shortly after passage through the cooling tier 156. Thus, it will be appreciated that the apparatus of the invention will be in the form of a highly compact simple unit adapted to completely and efficiently heat treat a material such as gypsum to change it into an end product having any desired characteristics and being in condition for immediate packaging for sale to the public.

Having described in detail the structural features of the preferred form of calciner the operation of the process in conjunction with such a calciner is as follows:

The gypsum rock prepared as previously described is fed into the feed hopper 10 from which it is transferred by means of screw conveyers 11 having heat exchange portions and through the pre-heat unit 12 into the aridizing unit 16 wherein it is sprayed with a drying agent to provide an end product of lower consistency, if desired. The ground gypsum rock then gravitates through the screen 28 which passes only properly pulverized material into the funnel 32 from whence it is channeled into the inlet port 36 of the tiered continuous calciner unit 38. The screw conveyers 60 to 63, inclusive, in each of the tiers 40 to 45, inclusive, operate to continuously convey the gypsum through the troughs 102 while being at all times in the immediate vicinity of a heat exchange surface of one of such tier units; the material residence time in each unit will be determined by both the speed of the screw conveyers and the size and/or position of the outlet ports 118 and the position of the slide gate 122 as hereinabove described. During the continuous progress of the gypsum through each tier unit, a heating fluid will be circulated through the fluid paths provided therein and will be maintained at temperatures dependent upon the temperature of the material at its input end, the capacity of the tier unit, the number of tier units comprising the continuous calciner, and the rate of flow of the gypsum through such unit as controlled by the speed of the screw conveyers 60 to 63, inclusive, and the flow control port 118 and the slide gate 122.

For example, it has been determined that with a total material residence time of two and one-half hours the inlet temperature of the heating medium may be maintained at substantially over 212° F. as long as a copious evolution of steam takes place due to the breakdown of the water of crystallization and as long as the temperature of the heating medium at the outlet end of the continuous calciner is under 400° F., preferably in the range from 300° F. to 350° F. at the point where the calcined end product is debouched. These temperatures in this case will be controlled to produce a product temperature at the output end of 50° F. to 100° F. below the temperature of the heating medium thereat, whereby a high grade uniform end product is produced.

However, it has been further determined that the apparatus herein particularly described may be efficiently continuously operated to provide a total material residence time of about eighteen minutes during which time the gypsum will be progressively heated to be debouched as a high quality product at a maximum temperature of about 335° F. by a heating medium at a temperature of about 430° F. at the inlet end and about 420° F. at the output end. In this case it is believed that these higher operating temperatures have produced a high grade uniform product having uniform quality and substantially no overburned gypsum because of the high degree of operational control built into this apparatus permitting uniform dispersal of heat throughout the gypsum in process whereby the steam evolved therefrom prevents overburning while simultaneously conveying the gypsum therethrough for a highly critical residence time whereby the heat treatment will be effectively discontinued at the precise moment that the desired calcination has occurred. For this reason, the continuous calciner may have the tier unit 156 arranged as aforesaid to chill and instantly cool the gypsum at the critical stage of calcination to insure against undesired evolution of steam which may change the uniformity in the attained characteristics of the end product and also to permit immediate processing and packaging upon completion of the calcining operation.

In the latter case it has been determined that the average temperatures of the gypsum in the succeeding tiers 40 to 45, inclusive, will be about 240° F., 250° F., 270° F., 290° F., 310° F. and 335° F., respectively. However, the same apparatus has been operated with residence times ranging from eighteen to thirty minutes with good results, the operating temperatures, of course, being varied proportionately with allowance for changes in the temperature of the entering material and the desired end product temperature. The range of gypsum temperatures in the various successive tiers of the present embodiment of the invention has been determined to be about room temperature to 260 F. 140° F. to 285° F., 180° F. to 320° F., 220° F. to 340° F., 260° F. to 360° F., 300° F. to 375° F., respectively.

As the gypsum rock is agitated by means of the indirectly heated screw conveyers 60 to 63, inclusive, and moved forwardly through the indirectly heated trough 102 of the tier 40, a portion of the water of crystallization is driven off and escapes into the atmosphere through vents 140 and 142. Thus, it will be appreciated that so long as there is a copious evolution of steam due to breakdown of the water of crystallization of the gypsum rock, the heating medium circulating through the various tiers may be maintained above 400° F. since in the apparatus of the invention the greatest distance from a heat exchange surface to any material being calcined is in the order of one inch as compared with approximately three feet in a kettle of equivalent capacity which is heated by direct means according to the teaching of the prior art.

Furthermore, in order to speed the calcining process each of the troughs 102 of the tiers 41 to 45, inclusive, will each communicate with the atmosphere through pairs of the apertures 148 to 152, respectively, provided in the vapor exhaust conduits 144 to 146 fitted to the tiers as hereinabove described.

Therefore, it will be appreciated that the method and apparatus of the present invention combine the advantages of higher temperature operation with increased speed of continuous calcination of gypsum in a highly compact apparatus capable of operating with high thermal efficiency in minimum space to continuously produce a product having the desired characteristics at a minimum cost.

The drawing attached hereto and the description hereinabove relate to the continuous calcination of gypsum in indirectly fired equipment and in which the calcination is performed at atmospheric pressures. The procedure and the equipment lends itself to operation under pressure and in which event steam vents 140—142 and the vapor conduits 144—146 including the openings 148 to 152, inclusive, are closed to the atmosphere but provided with pressure valving means which may be set manually or controlled automatically to vent at a predetermined pressure within the equipment.

In addition, feed hopper 10 is a conventional form of pressure feed and the discharge funnel 32 may be provided with a conventional form of pressure discharge device as, for instance, those of the Fuller type or similar equipment. In such an operation the pressure maintained within the equipment may be up to 25 pounds per square inch gauge or higher although a preferred operating pressure will probably be in the neighborhood of 15 to 20 pounds per square inch gauge.

In summary, calcination of gypsum material by the apparatus and process of this invention, can provide a substantially improved material, more uniform and of higher quality, at an equal cost in comparison to the material produced by prior methods and equipment. Alternatively, a calcined gypsum material of equal quality and characteristics can be produced in accordance with the invention at a substantial savings in labor, equipment cost, maintenance and supervision and with greatly reduced production difficulties in comparison with prior methods.

What is claimed is:

1. The method of continuously calcining gypsum comprising the steps of grinding gypsum rock to a fineness such that approximately 85% will pass through 100 mesh, continuously feeding said gypsum to an inlet of an elongate heating zone, conveying said gypsum as a substantially dry mass generally lengthwise of said zone, conveying said gypsum by only an indirectly heating mechanical motive force within the body of said gypsum, simultaneously additionally indirectly heating the moving body of said gypsum from a stationary source of supply of heat remote from said indirectly heating mechanical motive force to thus obtain a substantially uniform heating and movement of the entire mass of said gypsum, and repeatedly conveying and heating in like manner through a plurality of said heating zones.

2. The method of continuously calcining gypsum as defined in claim 1, including the additional steps of retarding the exit of said gypsum in said zone by damming, evenly discharging said gypsum from said zone by overflowing at an outlet portion of said zone, and guiding said overflowed material to the inlet of another heating zone.

3. The method of continuously calcining gypsum comprising the steps of grinding gypsum rocks to a fineness such that 85% will pass through 100 mesh, passing said ground gypsum successively through a plurality of elongate zones, maintaining substantially even speed of passage of all said particles relative to the speed of passage of all other particles, indirectly supplying heat to said gypsum throughout said zones, supplying said heat from sources so disposed throughout said zones that a maximum distance from substantially any portion of gypsum in said zones to a heat source is in the order of one inch, whereby said gypsum is progressively and evenly heated during said passage, and discharging a calcined end product at a product temperature below 400° F.

4. The method of continuously calcining gypsum comprising the steps of grinding gypsum rock to a fineness such that approximately 85% will pass through 100 mesh, continuously feeding said gypsum to an inlet of an elongate heating zone, conveying said gypsum as a substantially dry mass generally lengthwise of said zone, applying external conveying force substantially evenly throughout said mass whereby the dwell time of all particles in said zone is maintained generally equal to the dwell time of all other particles, applying heat evenly through said mass, maintaining all extraneous elements which contact said mass at temperatures over 212° F. and in the order of 400° F., damming and retaining said mass within said elongate heating zone during its passage along substantially the entire length of said heating zone, evenly overflowing said mass at an outlet portion of said zone, guiding said overflowed material to the inlet of another elongate heating zone, and repeatedly conveying, heating and overflowing in like manner in a plurality of said heating zones.

5. The method of continuously calcining gypsum as defined in claim 4, wherein the mass of gypsum in said elongate heating zone is continually agitated.

6. The method of continually calcining gypsum as defined in claim 4, wherein during said continuous feeding of said gypsum to a first zone an aridizing solution is intimately mixed therewith.

7. The method of continuously calcining gypsum as defined in claim 4, wherein said elongate heating zones are maintained at superatmospheric pressure.

8. The method of continuously calcining gypsum as defined in claim 4, wherein the vapors produced from said mass are continually withdrawn to preclude condensation within said zone.

9. A continuous gypsum calcining apparatus comprising essentially a plurality of generally elongate, substantially enclosed gypsum calcining zones arranged for the passage of gypsum successively therethrough, hollow, indirectly-heated, screw conveyors rotatively mounted within and extending generally horizontally substantially throughout said zones and closely nested therein, heating means, including said hollow screw conveyors, so constructed and disposed within and about said zones that a heat source is within in the order of one inch from any fluid-like material overflowingly disposed in said zone, each said zone having an inlet end and a discharge end, each said discharge end having means for overflowingly discharging said gypsum from said zone, and each adjacent pair of zones having means for guiding said discharged gypsum from said discharge end of one zone to said inlet end of said other zone, whereby gypsum may be continuously calcined with minimum residence time in the apparatus under optimum control conditions to achieve an end product having uniform desired characteristics with maximum efficiency of operation.

10. A continuous gypsum calcining apparatus comprising a plurality of superposed calciner tier units, said units including horizontally disposed screw conveyors rotatably mounted to closely nest in the bottom of generally elongate troughs, the bottoms of said troughs having a shape to conform to the general outline of said screw conveyors, said troughs further including generally vertical end walls at each end thereof, and upwardly extending side walls forming an enclosed calcining zone, indirect heating means extending substantially throughout the gypsum contacting portions of said trough bottoms and walls and substantially throughout said screw conveyors, said screw conveyors including center shafts rotatably mounted on means fixed relative to said end walls, said shafts extending through suitable stuffing boxes on at least one end wall, screw conveyor drive means attached to said shafts for driving said screw conveyors, means for supplying heat energy to all said indirect heating means, each said tier unit having an inlet end and a discharge end and adjacent tier units having said inlet and discharge ends oppositely disposed, each adjacent pair of said tier units having integral, substantially enclosed bustle portions disposed at the discharge end of the upper tier unit of each said pair and opening into the inlet end of the lower tier unit of said pair, flow metering weirs of predetermined size at discharge ends opening into the interior of said bustle portions, whereby gypsum may be continuously calcined with minimum residence time in the apparatus under optimum control conditions to achieve an end product having uniform desired characteristics with maximum efficiency of operation.

11. A continuous gypsum calcining apparatus as defined by claim 10 having selectively adjustable flood gate means disposed in said trough bottoms in the area of said discharge ends.

12. A continuous gypsum calcining apparatus as defined by claim 10, wherein said drive means are arranged to drive the screw conveyors in each trough at similar speeds while being selectively adjustable to vary the speeds thereof in the troughs of the various tier units.

13. A continuous gypsum calcining apparatus as defined by claim 10 wherein the screw conveyors in each said tier unit are intermeshingly disposed and wherein the maximum distance from a heat exchange surface to gypsum material withheld therein is in the order of one inch.

14. A continuous gypsum calcining apparatus as defined by claim 10 having means adapted and arranged to intersperse a drying agent in a supply of raw ground gypsum, said means communicating with the inlet of said calciner for continuous supply thereof.

15. A continuous gypsum calcining apparatus as defined by claim 10 further including a refrigerant for circulation through heat exchange portions of a last tier and means for processing and circulating said refrigerant through the heat exchange portions of said last tier.

16. A continuous gypsum calcining apparatus as defined by claim 10, wherein said apparatus is entirely enclosed and said apparatus further includes pressure feed and pressure discharge means to permit continuous pressure calcination of gypsum.

References Cited in the file of this patent
UNITED STATES PATENTS

| Number | Name | Date |
|---|---|---|
| 781,747 | Simonds | Feb. 7, 1905 |
| 1,746,294 | Tyler | Feb. 11, 1930 |
| 1,766,031 | Meakin | June 24, 1930 |
| 2,235,311 | Bullard | Mar. 18, 1941 |
| 2,247,221 | Dailey | June 24, 1941 |
| 2,328,395 | Neuman | Aug. 31, 1948 |